United States Patent
Chinnakkonda et al.

(10) Patent No.: US 9,329,648 B2
(45) Date of Patent: May 3, 2016

(54) PERFORMANCE MANAGEMENT OF SUBSYSTEMS IN A SERVER BY EFFECTIVE USAGE OF RESOURCES

(75) Inventors: Diyanesh Babu Vidyapoornachary Chinnakkonda, Bangalore (IN); Edgar Rolando Cordero, Round Rock, TX (US); Timothy J. Dell, Colchester, VT (US); Joab D. Henderson, Pflugerville, TX (US); Anil B. Lingambudi, Bangalore (IN); Girisankar Paulraj, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 13/550,689

(22) Filed: Jul. 17, 2012

(65) Prior Publication Data

US 2014/0025223 A1    Jan. 23, 2014

(51) Int. Cl.
  *G06F 1/00* (2006.01)
  *G06F 1/20* (2006.01)

(52) U.S. Cl.
  CPC ............ *G06F 1/206* (2013.01); *Y02B 60/1275* (2013.01)

(58) Field of Classification Search
  None
  See application file for complete search history.

(56) References Cited

U.S. PATENT DOCUMENTS

| | | | |
|---|---|---|---|
| 5,249,741 A | 10/1993 | Bistline et al. | 236/49.3 |
| 5,777,897 A | 7/1998 | Giorgio | 700/299 |
| 6,574,104 B2 * | 6/2003 | Patel et al. | 361/695 |
| 6,694,759 B1 * | 2/2004 | Bash et al. | 62/180 |
| 6,996,441 B1 * | 2/2006 | Tobias | 700/44 |
| 7,086,459 B2 | 8/2006 | Beitelmal et al. | 165/205 |
| 7,167,778 B2 * | 1/2007 | Yazawa et al. | 700/300 |
| 7,214,131 B2 * | 5/2007 | Malone | 454/184 |
| 7,289,939 B2 * | 10/2007 | Cascaval et al. | 702/196 |
| 7,337,018 B2 | 2/2008 | Espinoza-Ibarra et al. | 700/19 |
| 7,373,268 B1 * | 5/2008 | Viredaz et al. | 702/130 |
| 7,421,598 B2 * | 9/2008 | Brittain et al. | 713/320 |
| 7,742,844 B2 | 6/2010 | Coxe, III | 700/300 |
| 7,900,067 B2 | 3/2011 | Beard | |
| 8,909,383 B2 * | 12/2014 | Hadderman et al. | 700/299 |
| 2004/0109288 A1 * | 6/2004 | Beitelmal et al. | 361/687 |
| 2005/0011208 A1 * | 1/2005 | Dobbs et al. | 62/178 |
| 2005/0216222 A1 * | 9/2005 | Inoue | 702/136 |
| 2005/0216775 A1 * | 9/2005 | Inoue | 713/300 |
| 2005/0241810 A1 * | 11/2005 | Malone et al. | 165/122 |
| 2006/0013281 A1 * | 1/2006 | Sri-Jayantha et al. | 374/163 |
| 2007/0008698 A1 | 1/2007 | Kao | 361/679.48 |
| 2007/0124618 A1 * | 5/2007 | Aguilar et al. | 713/322 |
| 2007/0125107 A1 | 6/2007 | Beam | 62/186 |
| 2007/0225871 A1 * | 9/2007 | Karstens | 700/299 |

(Continued)

FOREIGN PATENT DOCUMENTS

| | | | | |
|---|---|---|---|---|
| DE | 102009034369 B3 | 8/2010 | | F04D 25/08 |
| GB | 2391729 A | 2/2004 | | H02P 7/28 |

*Primary Examiner* — Christopher E Everett
(74) *Attorney, Agent, or Firm* — VanLeeuwen & VanLeeuwen; Steven L. Bennett

(57) ABSTRACT

An approach is provided in which a subsystem cooling manager detects an increased workload indicator corresponding to a computer subsystem's forthcoming workload requirement. The forthcoming workload requirement corresponds to future computing resources required by the subsystem to support one or more software programs executing on the computer system. The subsystem cooling manager determines that the forthcoming workload requirement exceeds a utilization threshold and in turn, directs one or more cooling systems towards the corresponding subsystem according.

17 Claims, 7 Drawing Sheets

(56) References Cited

U.S. PATENT DOCUMENTS

| | | | |
|---|---|---|---|
| 2008/0059775 A1* | 3/2008 | Dang et al. | 712/221 |
| 2008/0104430 A1 | 5/2008 | Malone et al. | 713/300 |
| 2008/0209243 A1* | 8/2008 | Ghiasi et al. | 713/320 |
| 2008/0304229 A1 | 12/2008 | June et al. | 361/679.48 |
| 2009/0260795 A1 | 10/2009 | Perazzo | 165/269 |
| 2009/0293518 A1* | 12/2009 | Bettella | 62/186 |
| 2010/0131120 A1* | 5/2010 | Lewis et al. | 700/300 |
| 2010/0280680 A1* | 11/2010 | Angell et al. | 700/300 |
| 2010/0316501 A1 | 12/2010 | Bain | 416/246 |
| 2010/0324739 A1* | 12/2010 | Dawson et al. | 700/275 |
| 2011/0035078 A1* | 2/2011 | Jackson | 700/300 |
| 2011/0184568 A1 | 7/2011 | Tai et al. | 700/282 |
| 2011/0245991 A1 | 10/2011 | Keown, Jr. et al. | 700/300 |
| 2012/0053734 A1* | 3/2012 | Kazama et al. | 700/275 |

\* cited by examiner

PERFORMANCE MANAGEMENT OF SUBSYSTEMS IN A SERVER BY EFFECTIVE USAGE OF RESOURCES

BACKGROUND

The present disclosure relates to performance management of subsystems in a server by effective usage of resources. More particularly, the present disclosure relates to proactively directing cooling resources to electronic subsystems that are anticipated to generate increased heat due to an upcoming workload.

Computer systems include various components that comprise various subsystems. For example, a server may include multiple processors that are grouped into processor subsystems, as well as multiple memory devices that are grouped into memory subsystems. A computer system may also include a cooling system to cool the components when they exceed a particular temperature due to increased workload. For example, a processor may be tasked to process a large amount of data in a short amount of time, thus requiring increased frequency and voltage requirements and, as a result, generating more heat. In turn, the cooling system increases cooling activity (e.g., increasing fan speed) to cool the processor after it reaches a particular temperature.

BRIEF SUMMARY

According to one embodiment of the present disclosure, an approach is provided in which a subsystem cooling manager detects an increased workload indicator corresponding to a computer subsystem's forthcoming workload requirement. The forthcoming workload requirement corresponds to future computing resources required by the subsystem to support one or more software programs executing on the computer system. The subsystem cooling manager determines that the forthcoming workload requirement exceeds a utilization threshold and in turn, directs one or more cooling systems towards the corresponding subsystem accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
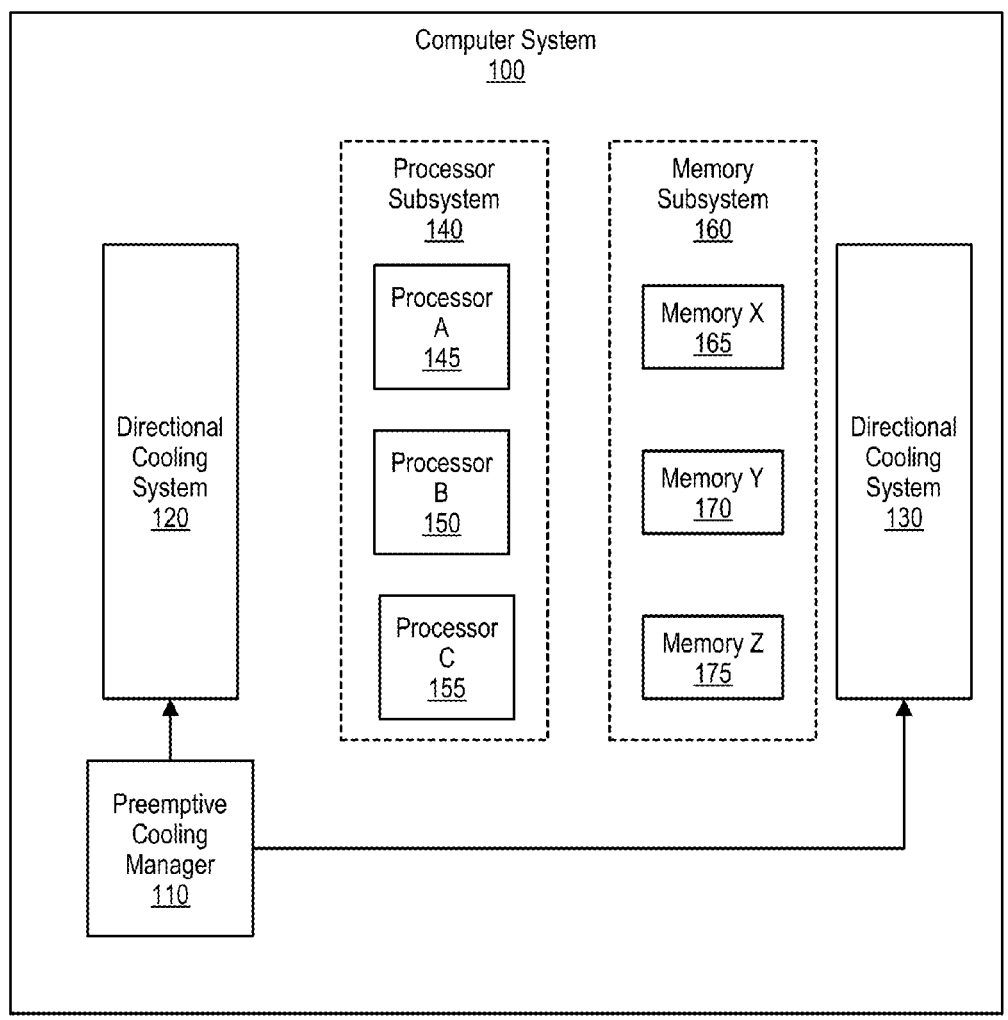
FIG. 1 is a diagram showing a computer system with a preemptive cooling manager that proactively directs cooling system resources to components corresponding to forthcoming increased workloads.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a computer system with a preemptive cooling manager that proactively directs cooling system resources to components corresponding to forthcoming increased workloads. Computer system 100 includes preemptive cooling manager 110, which monitors processor subsystem 140 and memory subsystem 160 for increased workload indicators, which are indicators that imply an increased workload (e.g., increased instruction queue utilization, increased frequency/voltage authorizations, utilization history, etc.). As such, preemptive cooling manager 110 instructs directional cooling systems 120 and 130 to begin cooling a particular subsystem prior to the subsystem commencing the increased workload and generating additional heat.

Preemptive cooling manager 110, in one embodiment, monitors instruction queue activity in processors 145, 150, and 155. When the instruction queue reaches a particular limit (e.g., 75% of capacity) for a particular amount of time, preemptive cooling manager 110 directs directional cooling systems 120 and 130 to commence cooling processor subsystem 140. As such, processor subsystem 140 is allocated with increased cooling resources prior to processor subsystem 140 executing the increased workload instructions and generating additional heat (see FIGS. 2, 3, and corresponding text for further details).

In another embodiment, preemptive cooing manager 110 monitors dynamic voltage and frequency scaling (DVFS) requests/authorizations and directs cooling resources to subsystems requesting (or being authorized) additional frequency or voltage. For example, computer system 100 may authorize processor B 150 to increase frequency in order to support an upcoming computation-intensive task. In this example, preemptive cooling manager 110 detects the frequency increase authorization and directs directional cooling systems 120 and 130 accordingly (before processor B 150 generates additional heat) (see FIG. 4 and corresponding text for further details).

In yet another embodiment, preemptive cooling manager 110 analyzes usage history to identify historical times at which a particular subsystem increases workload. For example, computer system 100 may backup memory subsystem 160 each night at 3:00 AM, which increases the workload of memories 165, 170, and 175. In this example, preemptive cooling manager 110 identifies the recurring workload event and directs directional cooling systems 120 and 130 to cool memory subsystem 160 at a time prior to 3:00 AM (see FIG. 5 and corresponding text for further details).

As those skilled in the art can appreciate, other embodiments may be employed to proactively detect upcoming workload requirements and allocate cooling resources accordingly.

Figure 2:
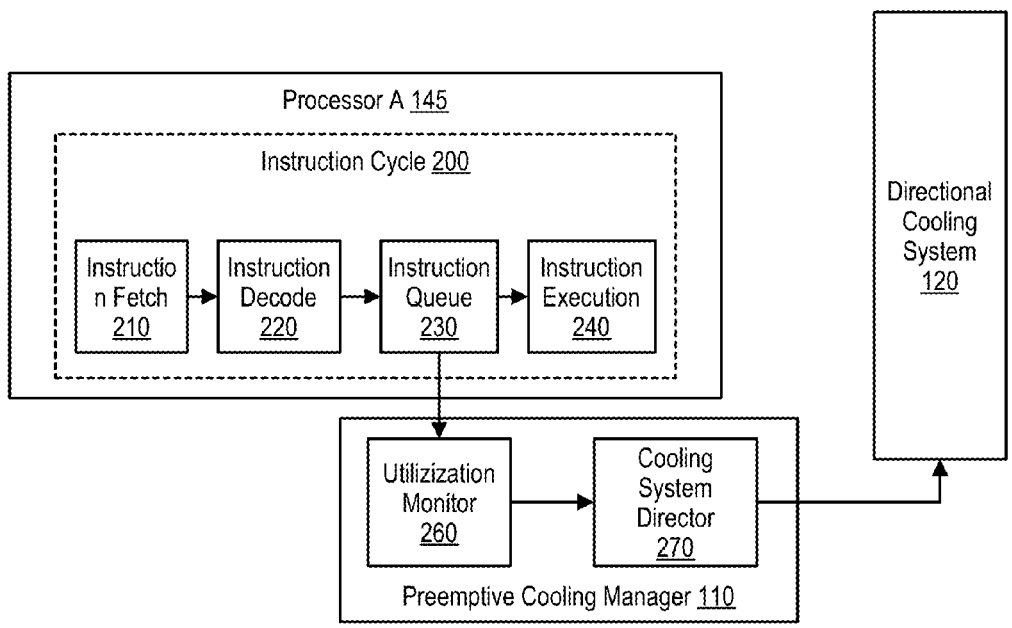
FIG. 2 is a diagram showing an embodiment of the present disclosure that monitors instruction queue capacity to identify upcoming high utilization events.

FIG. 2 is a diagram showing an embodiment of the present disclosure that monitors instruction queue capacity to identify upcoming high utilization events. In one embodiment, subsystem cooling manager 110 monitors instruction queue capacity utilization and re-directs cooling system 120 when the instruction queue capacity utilization exceeds a particular threshold (see FIG. 4 and corresponding text for further details).

Processor A 145 includes instruction cycle 200, which includes instruction fetch 210, instruction decode 220, instruction queue 230, and instruction execution 240. In order to proactively direct directional cooling system 120, preemptive cooling manager 110 utilizes utilization monitor 260 to track instruction queue activity. In one embodiment, utilization monitor 260 tracks instructions loaded into the instruction queue, and in another embodiment, utilization monitor 260 analyzes the amount of the instruction queue utilization. For example, utilization monitor may wait until the instruction queue fills to 75% of capacity, at which point utilization monitor 260 informs cooling system director 270. Cooling system director 270, in turn, directs directional cooling system 120 to the corresponding subsystem that is anticipated to generated additional heat due to the upcoming increased workload.

Figure 3:
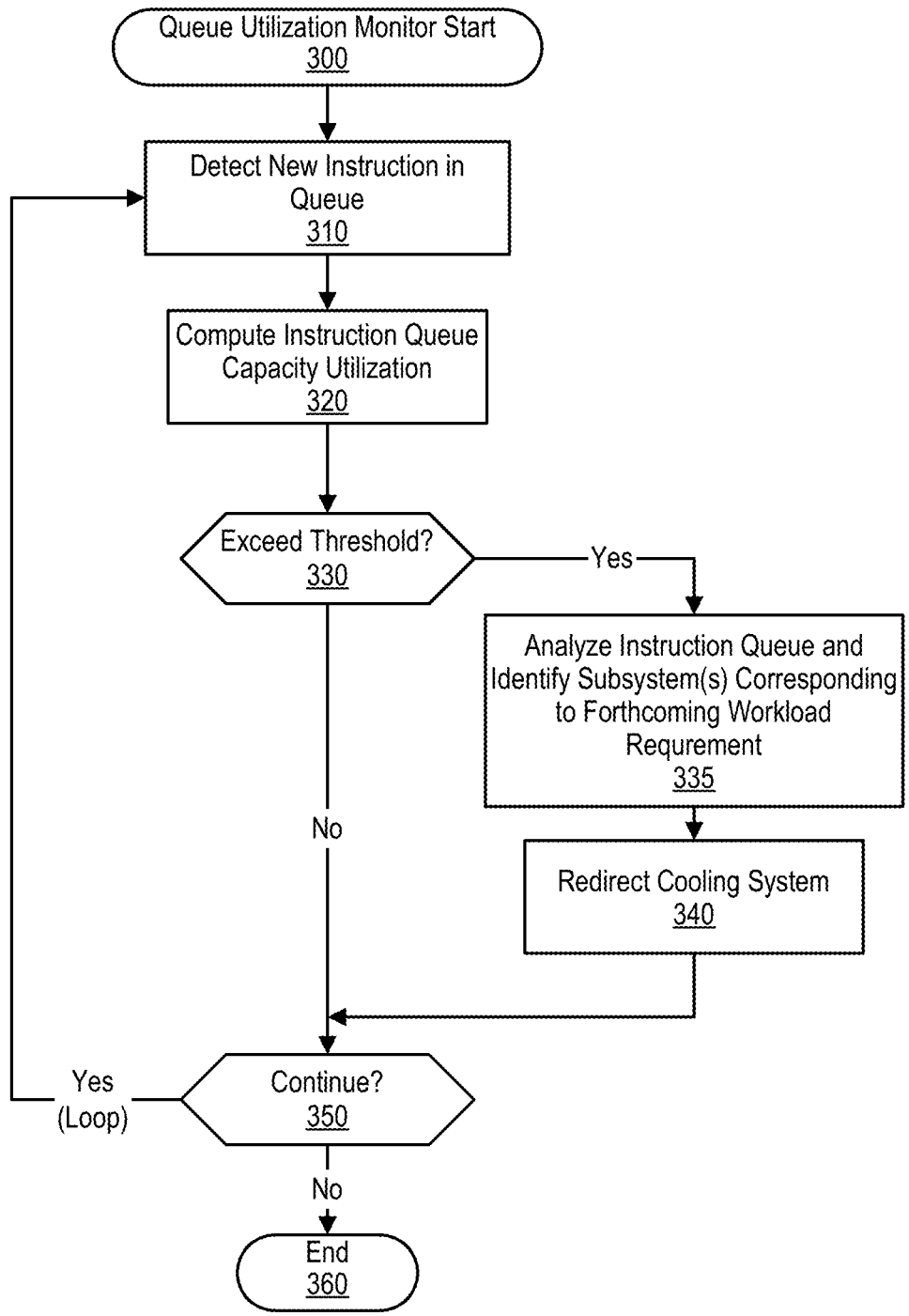
FIG. 3 is a flowchart showing steps taken in directing a cooling system to a subsystem in response to detecting an instruction queue's capacity utilization exceeding a threshold.

FIG. 3 is a flowchart showing steps taken in directing a cooling system to a subsystem in response to detecting an instruction queue's capacity utilization exceeding a threshold. In one embodiment, a subsystem cooling manager monitors instruction queue capacity utilization and re-directs cooling systems when the instruction queue capacity utilization exceeds a particular threshold (e.g., 75% utilized). In this embodiment, for example, the cooling systems may be directed to a particular processor prior to the processor executing an excessive amount of instructions. In turn, the proactive cooling nature described herein cools the processor before the processor generates excessive heat.

Processing commences at 300, whereupon the subsystem cooling manager detects a new instruction loaded into a processor's instruction queue (increased workload indicator) (step 310). At step 320, the subsystem cooling manager computes a queue utilization percentage to identify the amount of capacity that the processor's instruction queue is utilized. In one embodiment, the subsystem cooling manager may also analyze the instructions themselves to identify instructions requiring an excessive amount of processing resources such as high-computation intensive instructions.

A determination is made as to whether the queue utilization percentage exceeds a utilization threshold (decision 330). In one embodiment, the subsystem cooling manager analyzes an amount of time that the instruction queue maintains a high queue utilization percentage in order to avoid re-directing cooling systems in response to bursts of traffic, thus preventing fans from consistently pivoting.

If the queue utilization percentage exceeds the utilization threshold, decision 330 branches to the "Yes" branch, whereupon the subsystem cooling manager analyzes the instruction queue and identifies the subsystem corresponding to a forthcoming workload requirement (step 335). For example, the instructions may indicate that a particular processor or processor subsystem is about to embark in executing instructions that require an increased system clock speed. In this example, the subsystem cooling manager determines that the particular processor or processor subsystem will generate excessive heat during the instruction execution. At step 340, the subsystem cooling manager instructs one or more cooling systems to commence cooling the subsystems identified in step 335 above.

Referring back to decision 330, if the queue utilization percentage does not exceed the utilization threshold, decision 330 branches to the "No" branch, bypassing steps 335 and 340.

A determination is made as to whether to continue monitoring queue utilization (decision 350). If the subsystem cooling manager should continue to monitor queue utilization, decision 350 branches to the "Yes" branch, whereupon the subsystem cooling manager loops back to continue the monitoring process. This looping continues until the subsystem cooling manager determines to stop monitoring queue utilization, at which point decision 350 branches to the "No" branch, whereupon processing ends at 360.

In one embodiment, the subsystem cooling manager identifies forthcoming downstream workload requirements, which are future workload requirements for a "downstream" subsystem that processes data received from the subsystem identified in step 335. For example, a processor subsystem may perform heavy computations and pass the results to a downstream processor subsystem (or memory subsystem) that, in turn, may generate additional heat from the increased workload.

Figure 5:
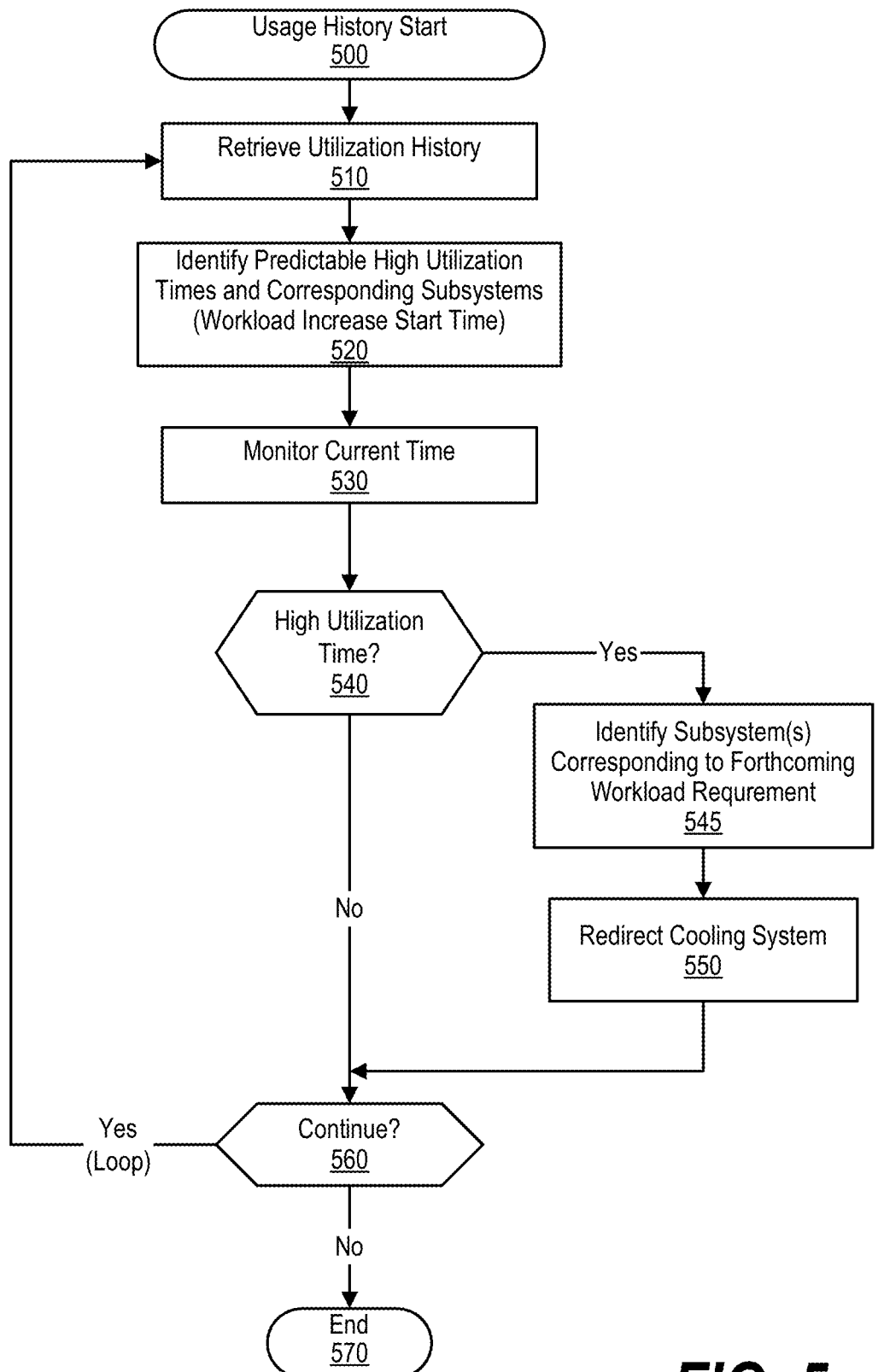
FIG. 5 is a flowchart showing steps taken in directing a cooling system to a subsystem in response to anticipating the start of a historically high utilization period.
Figure 6:
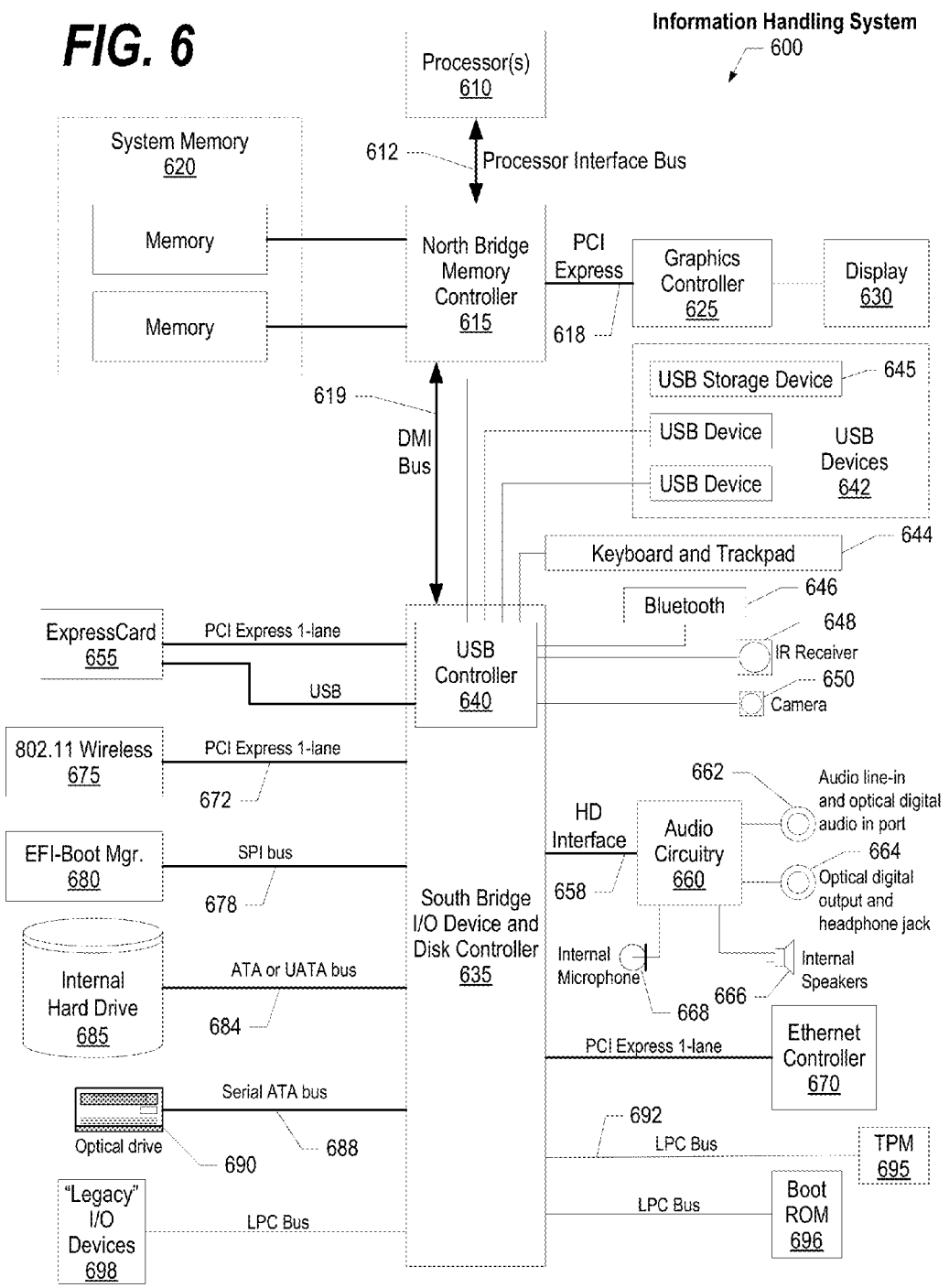
FIG. 6 is a block diagram of a data processing system in which the methods described herein can be implemented.

In another embodiment, the subsystem cooling manager utilizes other utilization anticipation mechanisms in addition to or instead of the mechanism shown in FIG. 3, such as monitoring frequency/voltage authorizations and/or utilization history (see FIGS. 5, 6, and corresponding text for further details).

Figure 4:
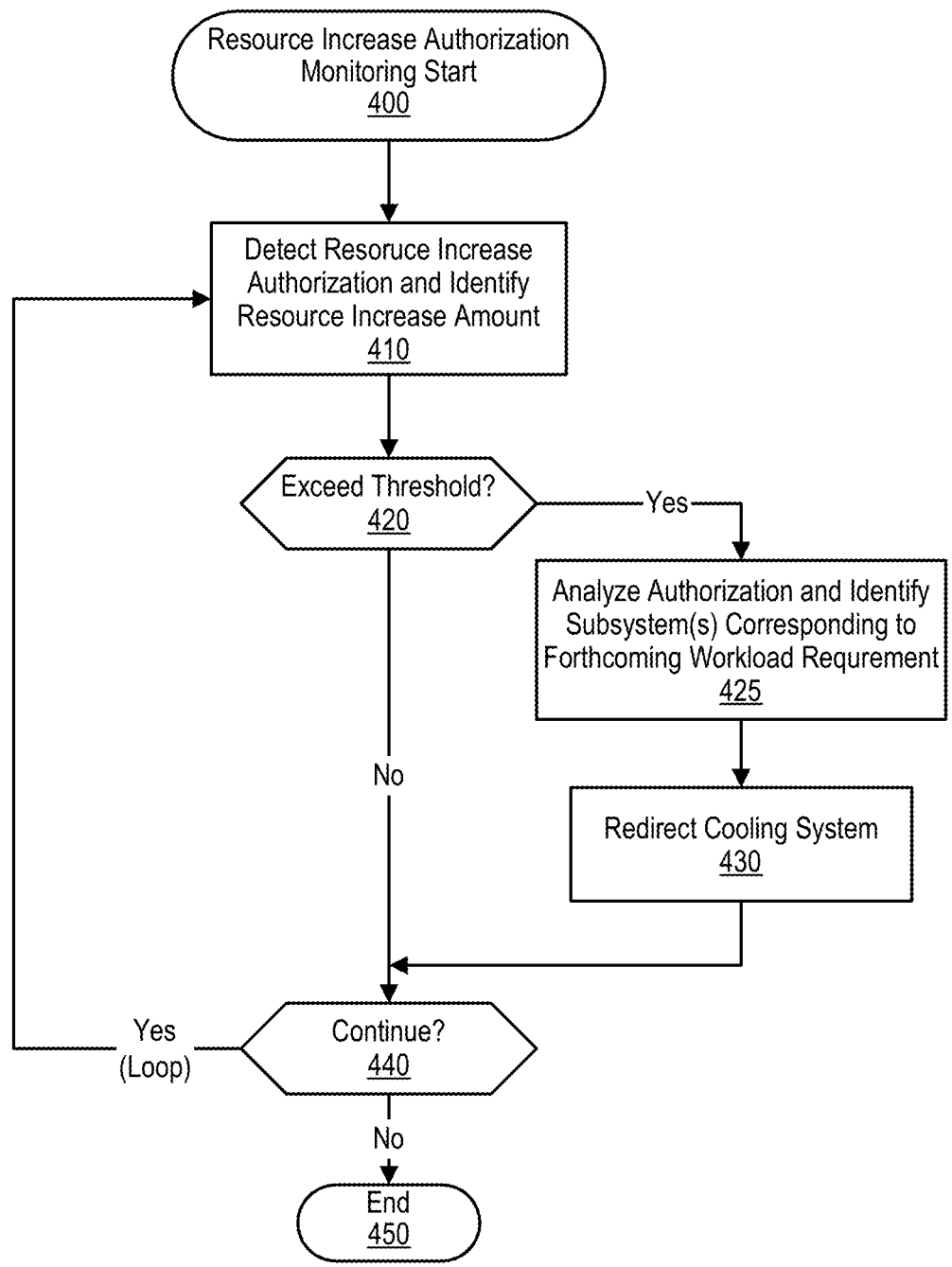
FIG. 4 is a flowchart showing steps taken in directing a cooling system to a subsystem in response to detecting a resource increase exceeds a utilization threshold.

FIG. 4 is a flowchart showing steps taken in directing a cooling system to a subsystem in response to detecting a resource increase exceeds a utilization threshold. In one embodiment, when a given subsystem has just been granted a resource increase authorization of additional frequency, the subsystem cooling manager anticipates that the subsystem will be executing an increased workload to take advantage of the additional frequency. If the given subsystem has also been granted a resource increase authorization of additional voltage to support that frequency, the power of that subsystem will also increase, which may facilitate the need for additional cooling. In one embodiment, frequency/voltage increase authorizations described herein are acted upon by the subsystem cooling manager prior to the subsystems actually increasing their frequency and/or voltage.

In another embodiment, the subsystem cooling manager monitors capacity upgrade on-demand authorizations. In this embodiment, resources (e.g., processor cores/modules and memory DIMMs) physically exist in the system, but require an access authorization to be used by a customer. When additional resources are purchased and enabled, the resources would likely be heavily utilized in the near future.

Processing commences at 400, whereupon the subsystem cooling manager detects a frequency and/or voltage increase authorization (increased workload indicator) and identifies a resource increase amount corresponding to the authorization (e.g., 10% increase, step 410). A determination is made as to whether the resource increase exceeds a utilization threshold (decision 420). For example, the subsystem cooling manager may not take action when a subsystem is granted a 2% frequency increase, but may take action when a subset is granted more than a 5% frequency increase along with a 5% voltage increase.

If the resource increase exceeds the utilization threshold, decision 420 branches to the "Yes" branch, whereupon the subsystem cooling manager analyzes the authorizations to identify the subsystem corresponding to the forthcoming workload requirement (step 425). At step 430, the subsystem cooling manager instructs one or more cooling systems to commence cooling the subsystems identified in step 425 above.

Referring back to decision 420, if the frequency/voltage increase authorization does not exceed the utilization threshold, decision 420 branches to the "No" branch, bypassing steps 425 and 430.

A determination is made as to whether to continue monitoring frequency/voltage increase authorizations (decision 440). If the subsystem cooling manager should continue to monitor frequency/voltage increase authorizations, decision 440 branches to the "Yes" branch, whereupon the subsystem cooling manager loops back to continue the monitoring process. This looping continues until the subsystem cooling manager determines to stop monitoring frequency/voltage authorizations, at which point the subsystem cooling manager branches to the "No" branch, whereupon processing ends at 450.

FIG. 5 is a flowchart showing steps taken in directing a cooling system to a subsystem in response to anticipating the start of a historically high utilization period. In one embodiment, the subsystem cooling manager analyzes fan adjustments on a long-term usage history and, if over time, particular subsystems tend to be utilized at predictable times, the subsystem cooling manager generates an algorithm to adjust the cooling systems to focus on those subsystems that are likely to be utilized next (e.g., peak work hours, etc.).

Processing commences at 500, whereupon the subsystem cooling manager retrieves utilization history at step 510. The utilization history, in one embodiment, is utilization data that was previously stored by the subsystem cooling manager. At step 520, the subsystem cooling manager identifies predictable increased utilization times and their corresponding workload increase start time. For example, the utilization history may show that at 9:00 AM every day, a processor subsystem requires increased cooling due to increased workload.

The subsystem cooling manager monitors the current time at step 530, and a determination is made as to whether the current time is in proximity (e.g., five minutes prior to) the workload increased start time (decision 540). If so, decision 540 branches to the "Yes" branch, whereupon the subsystem cooling manager analyzes the utilization history to identify the subsystem corresponding to workload increase start time (step 545) and, at step 550, the subsystem cooling manager instructs one or more cooling systems to commence cooling the subsystems identified in step 545 above.

Referring back to decision 540, if the current time is not in proximity to the workload increase start time, decision 540 branches to the "No" branch, bypassing steps 545 and 550.

A determination is made as to whether to continue monitoring the current time relative to the workload increase start time (decision 560). If the subsystem cooling manager should continue to monitor the current time relative to the workload increase start time, decision 560 branches to the "Yes" branch, whereupon the subsystem cooling manager loops back to continue the monitoring process. This looping continues until the subsystem cooling manager determines to stop monitoring the current time relative to the workload increase start time, at which point the subsystem cooling manager branches to the "No" branch, whereupon processing ends at 570.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 695) shown in FIG. 6 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 7.

Figure 7:
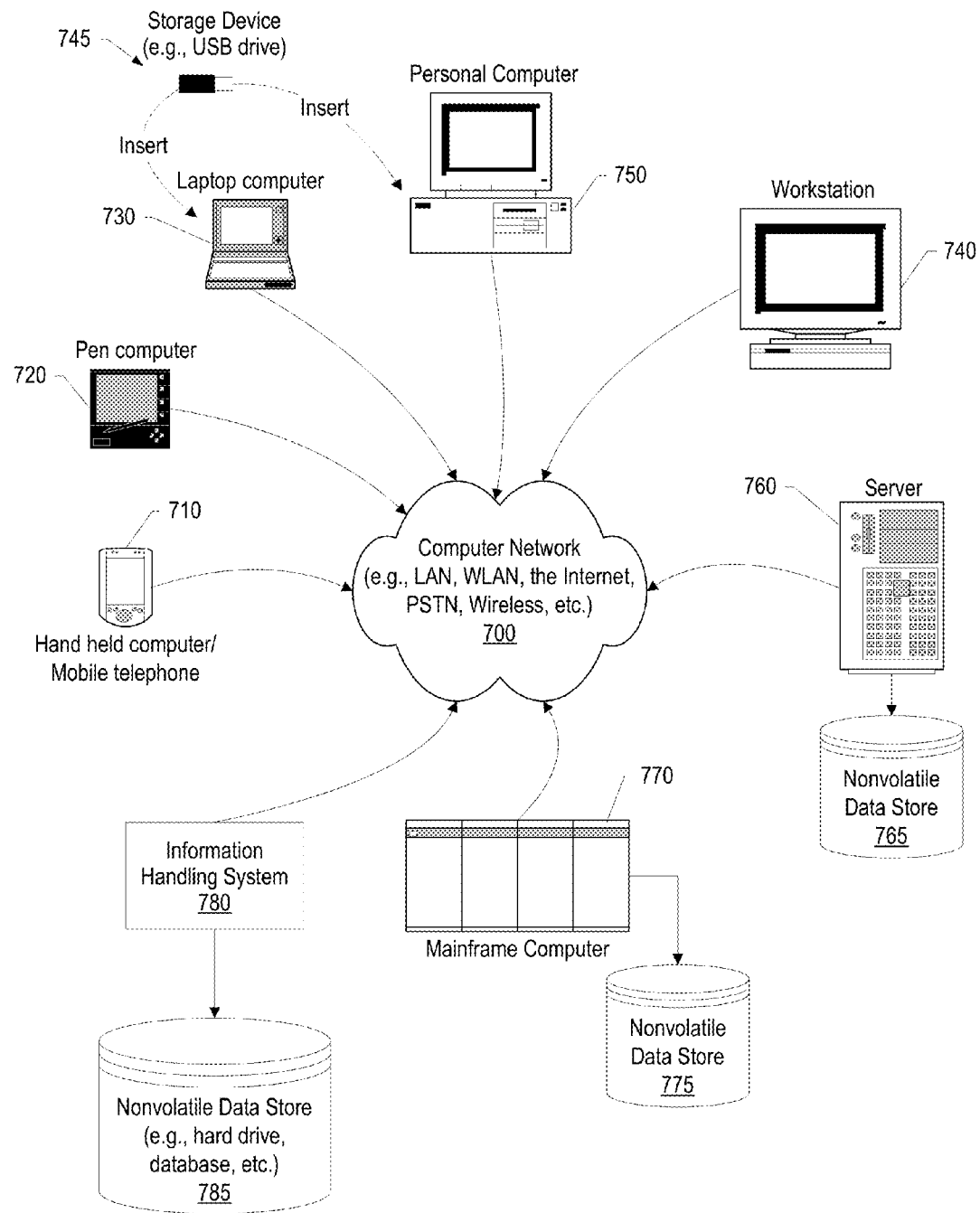
FIG. 7 provides an extension of the information handling system environment shown in FIG. 6 to illustrate that the methods described herein can be performed on a wide variety of information handling systems which operate in a networked environment.

FIG. 7 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 710 to large mainframe systems, such as mainframe computer 770. Examples of handheld computer 710 include personal digital assistants (PDAs), personal entertainment devices, such as MP3 players, portable televisions, and compact disc players. Other examples of information handling systems include pen, or tablet, computer 720, laptop, or notebook, computer 730, workstation 740, personal computer system 750, and server 760. Other types of information handling systems that are not individually shown in FIG. 7 are represented by information handling system 780. As shown, the various information handling systems can be networked together using computer network 700. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 7 depicts separate nonvolatile data stores (server 760 utilizes nonvolatile data store 765, mainframe computer 770 utilizes nonvolatile data store 775, and information handling system 780 utilizes nonvolatile data store 785). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:

computing, by one or more processors, a queue utilization percentage in response to detecting that one or more instructions are loaded into an instruction queue corresponding to a first subsystem in a computer system, wherein the queue utilization percentage identifies a utilization of capacity of the instruction queue prior to the first subsystem commencing execution of the one or more instructions, and wherein the instruction queue comprises at least the one or more instructions awaiting execution from the first subsystem;

determining, by one or more of the processors, that the queue utilization percentage exceeds a utilization threshold for a predetermined amount of time; and directing, by the one or more processors, one or more cooling systems from a second subsystem included in the computer system to the first subsystem in response to the determination.

2. The method of claim 1 wherein the detecting is performed prior to execution of the one or more instructions.

3. The method of claim 1 further comprising:

detecting a resource increase authorization corresponding to the first subsystem, wherein the resource increase authorization is selected from the group consisting of a frequency increase authorization, a voltage increase authorization, and a capacity upgrade on-demand authorization;

determining that the resource increase authorization corresponds to a resource increase that exceeds the utilization threshold; and performing the directing in response to determining that the resource increase exceeds the utilization threshold.

4. The method of claim 1 further comprising:

retrieving utilization history corresponding to the first subsystem, the utilization history including a historical workload increase start time;

determining that the historical workload increase start time is in proximity to a current time; and performing the directing in response to determining that the historical workload increase start time is in proximity to the current time.

5. The method of claim 1 wherein the computer system includes a plurality of subsystems, each of the plurality of subsystems selected from the group consisting of a processor subsystem and a memory subsystem.

6. The method of claim 1 further comprising:
   identifying a forthcoming downstream workload requirement, the forthcoming downstream workload requirement corresponding to a downstream subsystem included in the computer system that processes data subsequent to the first subsystem; and
   re-directing the one or more cooling systems to the corresponding downstream subsystem in response to identifying the forthcoming downstream workload requirement.

7. An information handling system comprising:
   one or more processors;
   a memory coupled to at least one of the processors;
   a set of computer program instructions stored in the memory and executed by at least one of the processors in order to perform actions of:
      computing, by one or more of the processors, a queue utilization percentage in response to detecting that one or more instructions are loaded into an instruction queue corresponding to a first subsystem in a computer system, wherein the queue utilization percentage identifies a utilization of capacity of the instruction queue prior to the first subsystem commencing execution of the one or more instructions, and wherein the instruction queue comprises at least the one or more instructions awaiting execution from the first subsystem;
      determining, by one or more of the processors, that the queue utilization percentage exceeds a utilization threshold for a predetermined amount of time; and
      directing, by the one or more processors, one or more cooling systems from a second subsystem included in the computer system to the first subsystem in response to the determination.

8. The information handling system of claim 7 wherein the detecting is performed prior to execution of the one or more instructions.

9. The information handling system of claim 7 wherein the processors perform additional actions comprising:
   detecting a resource increase authorization corresponding to the first subsystem, wherein the resource increase authorization is selected from the group consisting of a frequency increase authorization, a voltage increase authorization, and a capacity upgrade on-demand authorization;
   determining that the resource increase authorization corresponds to a resource increase that exceeds the utilization threshold; and
   performing the directing in response to determining that the resource increase exceeds the utilization threshold.

10. The information handling system of claim 7 wherein the processors perform additional actions comprising:
    retrieving utilization history corresponding to the first subsystem, the utilization history including a historical workload increase start time;
    determining that the historical workload increase start time is in proximity to a current time; and
    performing the directing in response to determining that the historical workload increase start time is in proximity to the current time.

11. The information handling system of claim 7 wherein the information handling system includes a plurality of subsystems, each of the plurality of subsystems selected from the group consisting of a processor subsystem and a memory subsystem.

12. The information handling system of claim 7 wherein the processors perform additional actions comprising:
    identifying a forthcoming downstream workload requirement, the forthcoming downstream workload requirement corresponding to a downstream subsystem included in the information handling system that processes data subsequent to the first subsystem; and
    re-directing the one or more cooling systems to the corresponding downstream subsystem in response to identifying the forthcoming downstream workload requirement.

13. A computer program product stored in a non-transitory computer readable storage medium, comprising computer program code that, when executed by an information handling system, causes the information handling system to perform actions comprising:
    computing, by one or more processors, a queue utilization percentage in response to detecting that one or more instructions are loaded into an instruction queue corresponding to a first subsystem in a computer system, wherein the queue utilization percentage identifies a utilization of capacity of the instruction queue prior to the first subsystem commencing execution of the one or more instructions, and wherein the instruction queue comprises at least the one or more instructions awaiting execution from the first subsystem;
    determining, by one or more of the processors, that the queue utilization percentage exceeds a utilization threshold for a predetermined amount of time; and
    directing, by the one or more processors, one or more cooling systems from a second subsystem included in the computer system to the first subsystem in response to the determination.

14. The computer program product of claim 13 wherein the detecting is performed prior to execution of the one or more instructions.

15. The computer program product of claim 13 comprising additional computer program code that, when executed by the information handling system, causes the information handling system to perform actions of:
    detecting a resource increase authorization corresponding to the first subsystem, wherein the resource increase authorization is selected from the group consisting of a frequency increase authorization, a voltage increase authorization, and a capacity upgrade on-demand authorization;
    determining that the resource increase authorization corresponds to a resource increase that exceeds the utilization threshold; and
    performing the directing in response to determining that the resource increase exceeds the utilization threshold.

16. The computer program product of claim 13 comprising additional computer program code that, when executed by the information handling system, causes the information handling system to perform actions of:
    retrieving utilization history corresponding to the first subsystem, the utilization history including a historical workload increase start time;
    determining that the historical workload increase start time is in proximity to a current time; and
    performing the directing in response to determining that the historical workload increase start time is in proximity to the current time.

17. The computer program product of claim 13 wherein the information handling system includes a plurality of subsystems, each of the plurality of subsystems selected from the group consisting of a processor subsystem and a memory subsystem.

* * * * *